United States Patent
Chiu et al.

(10) Patent No.: US 12,469,537 B2
(45) Date of Patent: Nov. 11, 2025

(54) SYSTEMS AND METHODS FOR READING BIT STATE IN ARRAYS OF MEMORY CELLS

(71) Applicant: TAIWAN SEMICONDUCTOR MANUFACTURING COMPANY, LTD., Hsinchu (TW)

(72) Inventors: Yen-Cheng Chiu, Hsinchu (TW); Win-San Khwa, Hsinchu (TW); Meng-Fan Chang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 67 days.

(21) Appl. No.: 17/685,478

(22) Filed: Mar. 3, 2022

(65) Prior Publication Data

US 2023/0282263 A1    Sep. 7, 2023

(51) Int. Cl.
*G11C 11/16* (2006.01)

(52) U.S. Cl.
CPC ...... *G11C 11/1673* (2013.01); *G11C 11/1693* (2013.01)

(58) Field of Classification Search
CPC ............ G11C 11/1673; G11C 11/1693; G11C 2013/0054; G11C 5/145; G11C 7/1048; G11C 7/12; G11C 7/14
USPC ........................................................ 135/158
See application file for complete search history.

(56) References Cited

U.S. PATENT DOCUMENTS

| | | | |
|---|---|---|---|
| 7,436,698 B2 | 10/2008 | Lin et al. | |
| 8,902,641 B2 | 12/2014 | Chih et al. | |
| 9,741,435 B1 | 8/2017 | Choy et al. | |
| 2004/0233150 A1* | 11/2004 | Guttag | G09G 5/10 345/87 |
| 2009/0010044 A1* | 1/2009 | Sakimura | G11C 11/1659 365/158 |
| 2010/0135066 A1* | 6/2010 | Jung | G11C 11/1673 365/158 |
| 2012/0206986 A1 | 8/2012 | Wang | |
| 2016/0328170 A1 | 11/2016 | Iyer et al. | |
| 2019/0287603 A1* | 9/2019 | Antonyan | G11C 7/227 |

\* cited by examiner

*Primary Examiner* — Alexander Sofocleous
*Assistant Examiner* — Tracy Hampton
(74) *Attorney, Agent, or Firm* — Hauptman Ham, LLP (57) ABSTRACT

Memory circuits that read the bit state of memory cells are disclosed. In some embodiments, a memory circuit, includes a memory cell configured to store a bit. A reference line is configured to receive a reference signal and a data line is configured to receive a data signal. The data line is configured to be selectively coupled to the memory cell. A charge voltage select unit is configured to charge the reference line and the data line in response to a select signal being in a first select state and discharge the reference line and the data line in response to the select signal being in a second select state. A sense amplifier is configured to compare the data signal and the reference signal to sense a bit state of the bit stored by the memory cell.

20 Claims, 7 Drawing Sheets

SYSTEMS AND METHODS FOR READING BIT STATE IN ARRAYS OF MEMORY CELLS

BACKGROUND

A magnetic random-access memory (MRAM) device is a memory device that uses spin torque transfer to change the variable resistive state between high and low resistive states. MRAMs are beneficial in that they retain stored data in the absence of electricity. Generally, MRAM includes a plurality of memory cells in an array. Each cell typically is capable of storing one bit of data. The advantages of using MRAM include smaller memory cell size, lower number of process steps as compared with other techniques for reading and writing to the memory cells, and scalability for large arrays. However, a disadvantage of MRAM is the amount of energy consumed when reading a memory cell.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

This disclosure describes systems and methods for reading the bit states of memory cells in a memory array. This disclosure is particularly applicable to circuits that read the bit state of resistive type memory cells, although the disclosure is also applicable to other types of memory cells. In some embodiments, a memory circuit includes a charge voltage select unit that charges a data line connected to a selected memory cell with a first reference voltage and discharges the data line connected to a selected memory cell with a second reference voltage. A sense amplifier is configured to sense the resistive state of selected memory cells both during the charging and the discharging of the data line. By sensing the bit states stored in memory cells both during the charging and the discharging of the data line, the energy consumed by the memory circuit is reduced. In some embodiments, memory circuits that read the bit state during both the charging and the discharging of the data line reduce energy consumption by 40% when compared to memory circuits that read the bit state only during the discharging of the data line.

Figure 1:
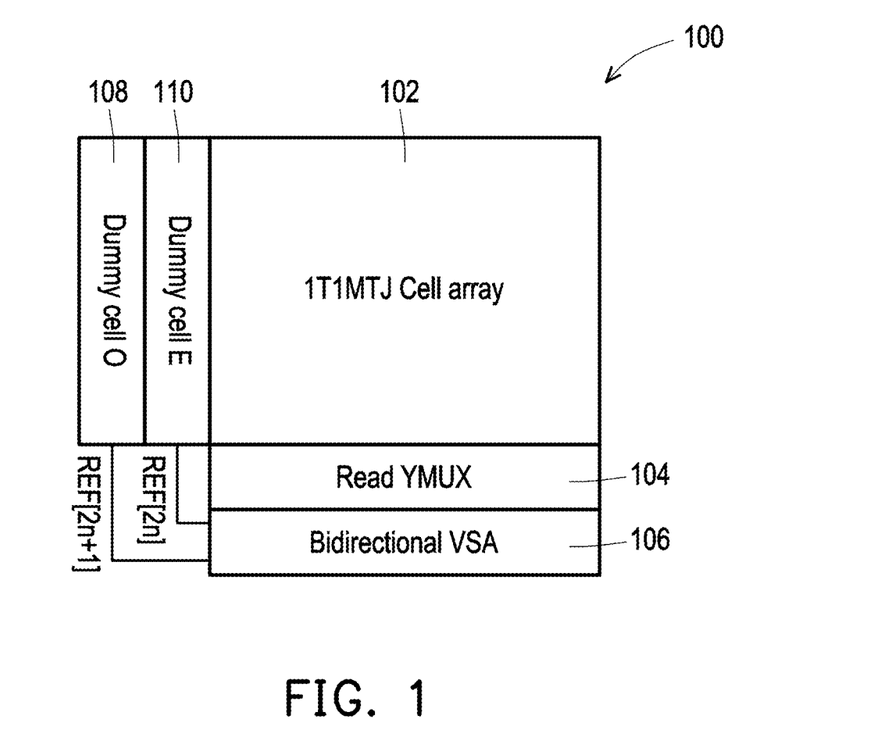
FIG. 1 is a block diagram of a memory circuit, in accordance with some embodiments.

FIG. 1 is a block diagram of a memory circuit 100, in accordance with some embodiments.

The memory circuit 100 includes a memory array of memory cells 102. Each of the memory cells 102 stores a bit that is either in a first bit state or a second bit state. In FIG. 1, each of the memory cells 102 is a Magnetoresistive Random Access Memory (MRAM) cell. An MRAM cell is a non-volatile memory technology that uses magnetic elements. For example, a Spin Transfer Torque Magnetoresistive Random Access Memory (STT-MRAM) cell uses electrons that become spin-polarized as the electrons pass through a thin film (spin filter). A STT-MRAM cell is also known as Spin Transfer Torque RAM (STT-RAM) cell, a Spin Torque Transfer Magnetization Switching RAM (Spin-RAM) cell, and a Spin Momentum Transfer (SMT-RAM) cell.

Each of the memory cells 102 includes a Magnetic Tunnel Junction (MTJ) storage element. In some embodiments, the MTJ storage element is formed from at least two ferromagnetic layers (a pinned layer and a free layer), each of which can hold a magnetic field or polarization, separated by a thin non-magnetic insulating layer (tunneling barrier). Electrons from the two ferromagnetic layers can penetrate through the tunneling barrier due to a tunneling effect under a bias voltage applied to the ferromagnetic layers. The magnetic polarization of the free layer can be reversed so that the polarity of the pinned layer and the free layer are either substantially aligned (parallel) or opposite (anti-parallel). The resistance of the electrical path through the MTJ varies depending on the alignment of the polarizations of the pinned and free layers. This variance in resistance can be used to program and read the memory cell. For example, in some embodiments, when the polarity of the pinned layer and the free layer are parallel, the memory cell is in a low resistive state. In some embodiments, when the polarity of the pinned layer and the free layer are anti-parallel, the memory cell is in a high resistive state.

During a read operation, the resistance of an MTJ element in the memory cell 102 is expressed as a current or voltage, in some embodiments. The current or voltage signal is applied to a bit line that is connected to the MTJ element. To select a particular bit line and thus a particular one of the memory cells 102, the memory circuit 100 includes a multiplexer 104. In some embodiments, the multiplexer 104 receives an address input and decodes the address input to select a bit line (and thus one of the memory cells 102). In some embodiments, a voltage has a voltage level that varies with resistance. The voltage is generated to charge the bit line and discharge the bit line of the selected memory cell 102, as explained in further detail below. The voltage is input into a bidirectional voltage sense amplifier (VSA) 106. The bidirectional VSA 106 is configured to read bit values of the selected memory cells 102 both during the charging phase and the discharging phase of the bit line.

To appropriately read the stored bit value based on the (high or low) resistance state of the MTJ storage element in the memory cell 102, the appropriate reference voltages REF[2n], REF[2n+1] are input into the VSA 106. In some embodiments, the reference voltage REF[2n] is input into the VSA 106. In some embodiments, the reference voltage REF[2n+1] is input into the VSA 106. The voltage generated on the bit line is compared against one of the reference voltages REF[2n], REF[2n+1] to distinguish the high and low resistance states of the selected MTJ storage element. The relatively higher and lower resistance states of the MTJ correspond with logical 'zero' or 'one' binary values of the selected memory cell 102.

In FIG. 1, a dummy memory cell 108 is configured to generate the reference voltage REF[2n+1]. In some embodiments, the dummy memory cell 108 has an MTJ storage element whose resistance is the average of the high resistance state and the low resistance state of the MTJ storage elements of the memory cells 102 (i.e., (RH+RL)/2). Accordingly, the reference voltage REF[2n+1] is used as a reference for discriminating between high and low resistance states of the MTJs of the memory cells 102. Instead of the average, other types of dummy reference MTJ or other elements provide a different parameter value that is known to fall at an intermediate point, such as a parallel resistance value with an added series resistance.

In FIG. 1, a dummy memory cell 110 is configured to generate the reference voltage REF[2n]. In some embodiments, the dummy memory cell 110 has an MTJ whose resistance is the average of the high resistance state and the low resistance state of the MTJs of the memory cells 102 (i.e., (RH+RL)/2). Accordingly, the reference voltage REF [2n] is used as a reference for discriminating between high and low resistance states of the MTJs of the memory cells 102.

In some embodiments, the dummy memory cells 108, 110 have a different resistance value that is known to fall at an intermediate point, such as a parallel resistance value with an added series resistance. The dummy memory cells 108, 110 are produced in the same process as the memory cells 102 whose resistance state is to be discriminated, e.g., being located on the same circuit chip and therefore similarly affected by process variations with the dummy memory cells 108, 110.

Figure 2:
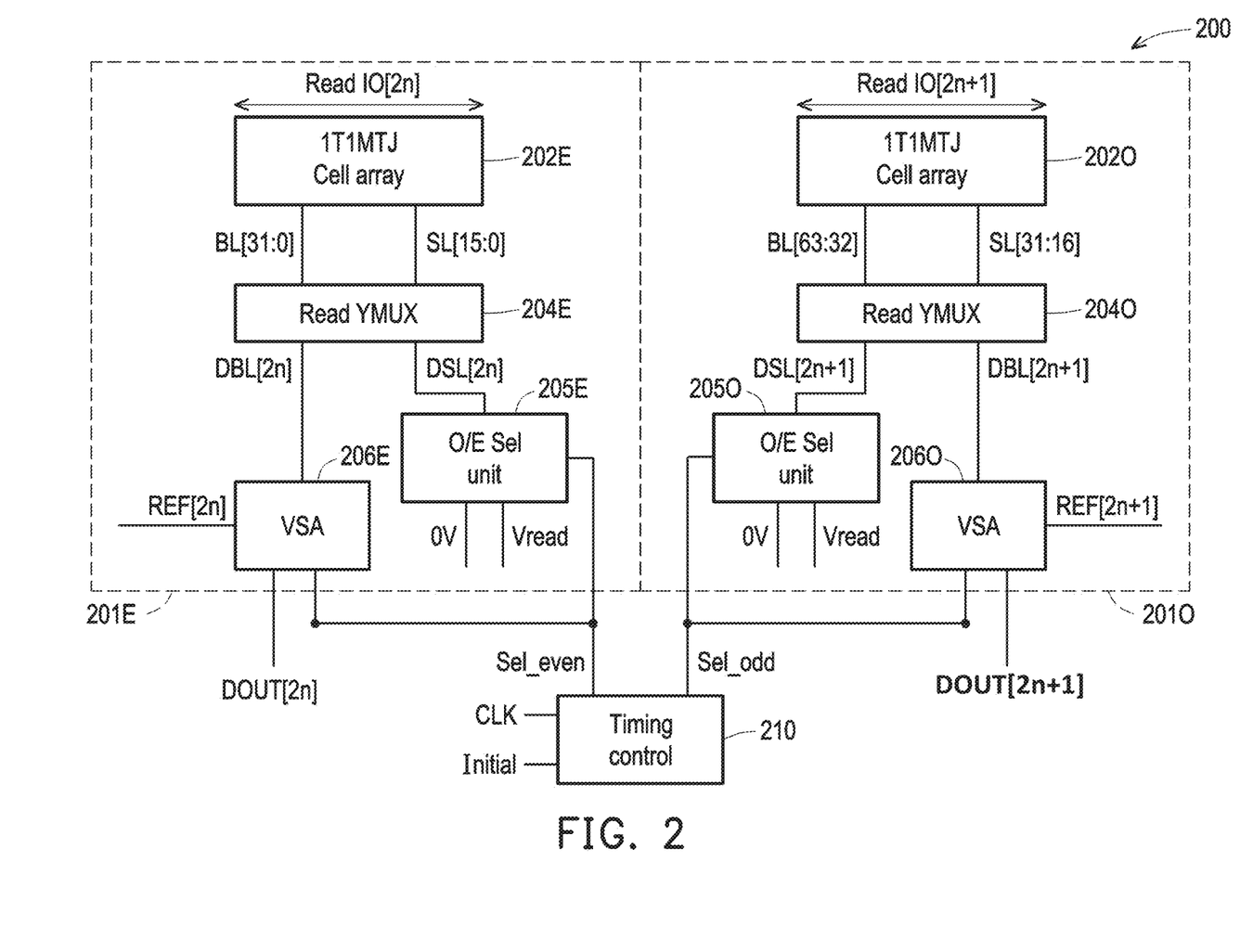
FIG. 2 is a block diagram of a memory circuit, in accordance with some embodiments.

FIG. 2 is a block diagram of a memory circuit 200, in accordance with some embodiments.

The memory circuit 200 includes a memory subcircuit 201E and a memory subcircuit 201O. The memory subcircuit 201E corresponds with the memory circuit 100 in FIG. 1. The memory subcircuit 201O also corresponds with the memory circuit 100 in FIG. 1. In some embodiments, the memory subcircuit 201E is referred to as the even circuit and the memory subcircuit 201O is referred to as the odd circuit.

The memory subcircuit 201E includes a memory array of memory cells 202E. The memory array of memory cells 202E corresponds with the memory array of memory cells 102 in FIG. 1. In some embodiments, each of the memory cells 202E includes an MTJ. The MTJ is configured to have a variable resistance that is switchable between a high resistance state and a low resistance state.

The array of the memory cells 202E is arranged such that bit lines BL [31:0] and select lines SL[15:0] intersect the memory cells 202E in a grid array. Rows of the memory cells 202E are each connected to a different select line SL[15:0] and columns of the memory cells are connected to a different one or a different pair of bit lines BL[31:0].

The memory subcircuit 201E includes a multiplexer 204E. The multiplexer 204E is connected to the bit lines BL[31:0] and select line SL[15:0]. To select a particular one of the memory cells 202E, the multiplexer 204E is configured to select a select line SL[15:0]. and a bit line BL[31:0]. The selected select line SL[15:0]. is selectively coupled through the multiplexer 204E to a data select line DSL[2n]. The selected bit line BL[31:0] is selectively coupled to a data bit line DBL[2n]. A select line control signal, e.g., a select line control signal SL control discussed below with respect to FIG. 3, on the selected select line SL[15:0] opens and closes a discharging path for the selected data bit line BL[31:0] and selected memory cell 202E. When the select line control signal is in the non-select state, the charging and the discharging path are disabled so the selected bit line BL[31:0] and the selected memory cell 202E do not reach the rail voltages (e.g., a first reference voltage Vread or a second reference voltage 0V). When the select line control signal is in the select state, the charging and the discharging path are enabled so the selected bit line BL[31:0] and the selected memory cell 202E reach the rail voltages (e.g., the first reference voltage Vread or the second reference voltage 0V).

The data bit line DBL[2n] is connected to an input in a VSA 206E corresponding to VSA 106 discussed above. Thus, the selected bit line BL[31:0] is selectively coupled as an input to the VSA 206E by the multiplexer 204E. The data select line DSL[2n] is connected to an output of the charge voltage select unit 205E. Thus, the data select line DSL[2n] is coupled to the data bit line DBL[2n] through the selected memory cell 202E and the selected bit line BL[31:0]. The charge voltage select unit 205E is configured to receive as inputs a first reference voltage (which in this embodiment is voltage Vread), a second reference voltage (which in this embodiment is ground voltage 0V), and a select signal Sel_even. The select signal Sel_even is a clock signal that oscillates between a first select state and a second select state. In some embodiments, the select signal Sel_even has a 50% duty cycle. The charge voltage select unit 205E is configured to apply the first reference voltage Vread to the selected memory cell 202E, the selected bit line BL[31:0], and the data bit line DBL[2n] in response to the select signal Sel_even being in the first select state and to apply the second reference voltage 0V to the selected memory cell 202E, the selected data bit line BL[31:0], and the data bit line DBL[2n] in response to the select signal Sel_even being in the second select state.

In some embodiments, the first reference voltage Vread has a DC voltage level. DC voltage levels are constant or nearly constant (i.e., constant within acceptable error ranges). In some embodiments, the DC voltage level of Vread is a DC voltage level of a DC power source voltage such as VDD or is proportional to the DC voltage level of the DC power source voltage such as VDD. In some embodiments, DC voltage level of the first reference voltage Vread is positive. In some embodiments, the second reference voltage has a DC voltage level of 0V. In some embodiments, the second reference voltage is ground. In some embodiments, the second reference voltage has a DC voltage level that is positive or negative. The first reference voltage has a voltage level that is greater than a voltage level of the second reference voltage.

A reference line REF[2n] is connected as an input to the VSA 206E. The VSA 206E is configured to compare a voltage applied to the reference line REF[2n] with the voltage applied to the data bit line DBL[2n] to determine whether the selected memory cell 202E is in the high resistance state or the low resistance state. The voltage output by the charge voltage select unit 205E also charges and discharges the reference line REF[2n]. When the charge voltage select unit 205E selects the first reference voltage Vread, the reference line REF[2n] is charged and when the charge voltage select unit 205E selects the second reference voltage 0V, the reference line REF[2n] is discharged.

When the reference line REF[2n] and the data bit line DBL[2n] are being charged by the first reference voltage Vread and the selected memory cell 202E is in the high resistance state, the data bit line DBL[2n] charges slower than the reference line REF[2n]. In this case, the VSA 206E initially reads a logic 0 but then inverts the logic 0 to logic 1. The VSA 206E is configured to invert the logic state in response to the select signal Sel_even being in the first select state. Thus, the VSA 206E generates an output voltage DOUT [2n] in a high voltage state, which corresponds with logic 1 in this embodiment.

When the reference line REF[2n] and the data bit line DBL[2n] are being charged by the first reference voltage Vread and the selected memory cell 202E is in the high resistance state, the data bit line DBL[2n] charges faster than the reference line REF[2n]. In this case, the VSA 206E initially reads logic 1 but then inverts the logic 1 to logic 0. The VSA 206E is configured to invert the logic state in response to the select signal Sel_even being in the first select state. Thus, the VSA 206E generates the output voltage DOUT [2n] in a low voltage state, which corresponds with logic 0 in this embodiment.

When the reference line REF [2n] and the data bit line DBL[2n] are being discharged by the second reference voltage 0V and the selected memory cell 202E is in the high resistance state, the data bit line DBL[2n] discharges slower than the reference line REF[2n]. In this case, the VSA 206E reads logic 1 and does not invert the logic 1. The VSA 206E is configured to not invert the logic state in response to the select signal Sel_even being in the second select state. Thus, the VSA 206E generates the output voltage DOUT [2n] in the high voltage state, which corresponds with logic 1 in this embodiment.

When the reference line REF[2n] and the data bit line DBL[2n] are being discharged by the second reference voltage 0V and the selected memory cell 202E is in the low resistance state, the data bit line DBL[2n] discharges faster than the reference line REF[2n]. In this case, the VSA 206E reads logic 0 and does not invert the logic 0. The VSA 206E is configured to not invert the logic state in response to the select signal Sel_even is in the second select state. Thus, the VSA 206E generates the output voltage DOUT [2n] in the low voltage state, which corresponds with logic 0 in this embodiment.

The memory subcircuit 201O includes a memory array of memory cells 202O. The memory array of memory cells 202O correspond to the memory array of memory cells 102 in FIG. 1. In some embodiments, each of the memory cells 202O includes an MTJ. The MTJ is configured to have a variable resistance that is switchable between a high resistance state and a low resistance state.

The array of the memory cells 202O is arranged such that bit lines BL[63:32] and select lines SL[31:16] intersect the memory cells 202O in a grid array. Rows of the memory cells 202O are each connected to a different select line SL[31:16] and columns of the memory cells are connected to a different one or a different pair of bit lines BL[63:32].

The memory subcircuit 201O includes a multiplexer 204O. The multiplexer 204O is connected to the bit lines BL[63:32] and select line SL[31:16]. To select a particular one of the memory cells 202O, the multiplexer 204 is configured to select a select line SL[31:16]. and a bit line BL[63:32]. The selected select line SL[31:16]. is selectively coupled through the multiplexer 204O to a data select line DSL[2n+1]. The selected bit line BL[63:32] is selectively coupled to a data bit line DBL[2n+1]. When select line control signal is in the non-select state, the charging and the discharging path are disabled so the selected bit line BL[63:32] and the selected memory cell 202E do not reach the rail voltages (e.g., the first reference voltage Vread or the second reference voltage 0V). When select line control signal is in the select state, the charging and the discharging path are enabled so the selected bit line BL[63:32] and the selected memory cell 202E reach the rail voltages (e.g., the first reference voltage Vread or the second reference voltage 0V).

The data bit line DBL[2n+1] is connected to an input in a VSA 206O corresponding to VSA 106 discussed above. Thus, the selected bit line BL[63:32] is selectively coupled as an input to the VSA 206O by the multiplexer 204O. The data select line DSL[2n+1] is connected to an output of a charge voltage select unit 205O. Thus, the data select line DSL[2n+1] is coupled to the data bit line DBL[2n+1] through the selected memory cell 202O and the selected bit line BL[63:32]. The charge voltage select unit 205O is configured to receive as inputs the first reference voltage (which in this embodiment is voltage Vread), the second reference voltage (which in this embodiment is ground voltage 0V), and a select signal Sel_odd. The select signal Sel_odd is a clock signal that oscillates between the first select state and the second select state. In some embodiments, the select signal Sel_odd has a 50% duty cycle. The charge voltage select unit 205O is configured to apply the first reference voltage Vread to the selected memory cell 202O, the selected bit line BL[63:32], and the data bit line DBL[2n+1] in response to the select signal Sel_even being in the first select state and to apply the second reference voltage 0V to the selected memory cell 202O, the selected bit line BL[63:32], and the data bit line DBL[2n+1] in response to the select signal Sel_odd being in the second select state.

In some embodiments, the select signal Sel_odd is the same as the select signal Sel_even except that the select signal Sel_odd and the select signal Sel_even have a phase difference of 180 degrees. Thus, when the select signal Sel_even is in the first select state, the select signal Sel_odd is the second select state and, when the select signal Sel_even is in the second select state, the select signal Sel_odd is the first select state. Accordingly, the charge voltage select unit 205E is charging the selected memory cell 202E, the selected bit line BL[31:0], and the data bit line DBL[2n] with the first reference voltage Vread when the charge voltage select unit 205O is discharging the selected memory cell 202O, the selected bit line BL[63:32], and the data bit line DBL[2n+1] with the second reference voltage 0V. The charge voltage select unit 205E is discharging the selected memory cell 202E, the selected bit line BL[31:0], and the data bit line DBL[2n] with the second reference voltage 0V when the charge voltage select unit 205O is charging the selected memory cell 202O, the selected bit line BL[63:32], and the data bit line DBL[2n+1] with the first reference voltage Vread.

A reference line REF[2n+1] is connected as an input to the VSA 206O. The VSA 206O is configured to compare a voltage applied to the reference line REF[2n+1] with the voltage applied to the data bit line DBL[2n+1] to determine whether the selected memory cell 202O is in the high resistance state or the low resistance state. The voltage output by the charge voltage select unit 205E also charges and discharges the reference line REF[2n+1]. When the charge voltage select unit 205E selects the first reference voltage Vread, the reference line REF[2n+1] is charged and when the charge voltage select unit 205E selects the second reference voltage 0V, the reference line REF[2n+1] is discharged.

When the reference line REF[2n+1] and the data bit line DBL[2n+1] are being charged by the first reference voltage Vread and the selected memory cell 202O is in the high resistance state, the data bit line DBL[2n+1] charges slower than the reference line REF[2n+1]. In this case, the VSA 206O initially reads logic 0 but then inverts the logic 0 to logic 1. The VSA 206O is configured to invert the logic state in response to the select signal Sel_odd being in the first select state. Thus, the VSA 206O generates the output voltage DOUT [2n+1] in the high voltage state, which corresponds with logic 1 in this embodiment.

When the reference line REF[2n+1] and the data bit line DBL[2n+1] are being charged by the first reference voltage Vread and the selected memory cell 202O is in the high resistance state, the data bit line DBL[2n+1] charges faster than the reference line REF[2n+1]. In this case, the VSA 206O initially reads logic 1 but then inverts the logic 1 to logic 0. The VSA 206O is configured to invert the logic state in response to the select signal Sel_odd being in the first select state. Thus, the VSA 206O generates the output voltage DOUT [2n+1] in the low voltage state, which corresponds with logic 0 in this embodiment.

When the reference line REF[2n+1] and the data bit line DBL[2n+1] are being discharged by the second reference voltage 0V and the selected memory cell 202O is in the high resistance state, the data bit line DBL[2n+1] discharges slower than the reference line REF[2n+1]. In this case, the VSA 206O reads logic 1 and does not invert the logic 1. The VSA 206O is configured to not invert the logic state in response to the select signal Sel_odd being in the second select state. Thus, the VSA 206O generates the output voltage DOUT [2n+1] in the high voltage state, which corresponds with logic 1 in this embodiment.

When the reference line REF[2n+1] and the data bit line DBL[2n+1] are being discharged by the second reference voltage 0V and the selected memory cell 202O is in the low resistance state, the data bit line DBL[2n+1] discharges faster than the reference line REF[2n+1]. In this case, the VSA 206O reads logic 0 and does not invert the logic 0. The VSA 206O is configured to not invert the logic state in response to the select signal Sel_odd being in the second select state. Thus, the VSA 206O generates the output voltage DOUT [2n+1] in the low voltage state, which corresponds with logic 0 in this embodiment.

The memory circuit 200 includes a timing control circuit 210. The timing control circuit 210 is configured to generate the select signal Sel_even and the select signal Sel_odd based on a clock signal CLK. The timing control circuit 210 is configured to receive an initiate signal Initial configured to initiate the select signal Sel_even in the first select state and to initiate the select signal Sel_odd in the second select state. After the select signals Sel_even, Sel_odd are initiated, the select signals Sel_even, Sel_odd switch between the first select state and the second select state in accordance with the clock signal CLK. In some embodiments, the select signal Sel_odd is the same as the select signal Sel_even except that the select signal Sel_odd and the select signal Sel_even have a phase difference of 180 degrees. Thus, when the select signal Sel_even is in the first select state, the select signal Sel_odd is the second select state and, when the select signal Sel_even is in the second select state, the select signal Sel_odd is the first select state. Accordingly, the charge voltage select unit 205E is charging the selected memory cell 202E, the selected bit line BL[31:0], the reference line REF [2n] and the data bit line DBL[2n] with the first reference voltage Vread when the charge voltage select unit 205O is discharging the selected memory cell 202O, the selected bit line BL[63:32], the reference line REF [2n+1] and the data bit line DBL[2n+1] with the second reference voltage 0V. The charge voltage select unit 205E is discharging the selected memory cell 202E, the selected bit line BL[31:0], the reference line REF [2n] and the data bit line DBL[2n] with the second reference voltage 0V when the charge voltage select unit 205O is charging the selected memory cell 202O, the selected bit line BL[63:32], the reference line REF [2n+1], and the data bit line DBL[2n+1] with the first reference voltage Vread.

Figure 3:
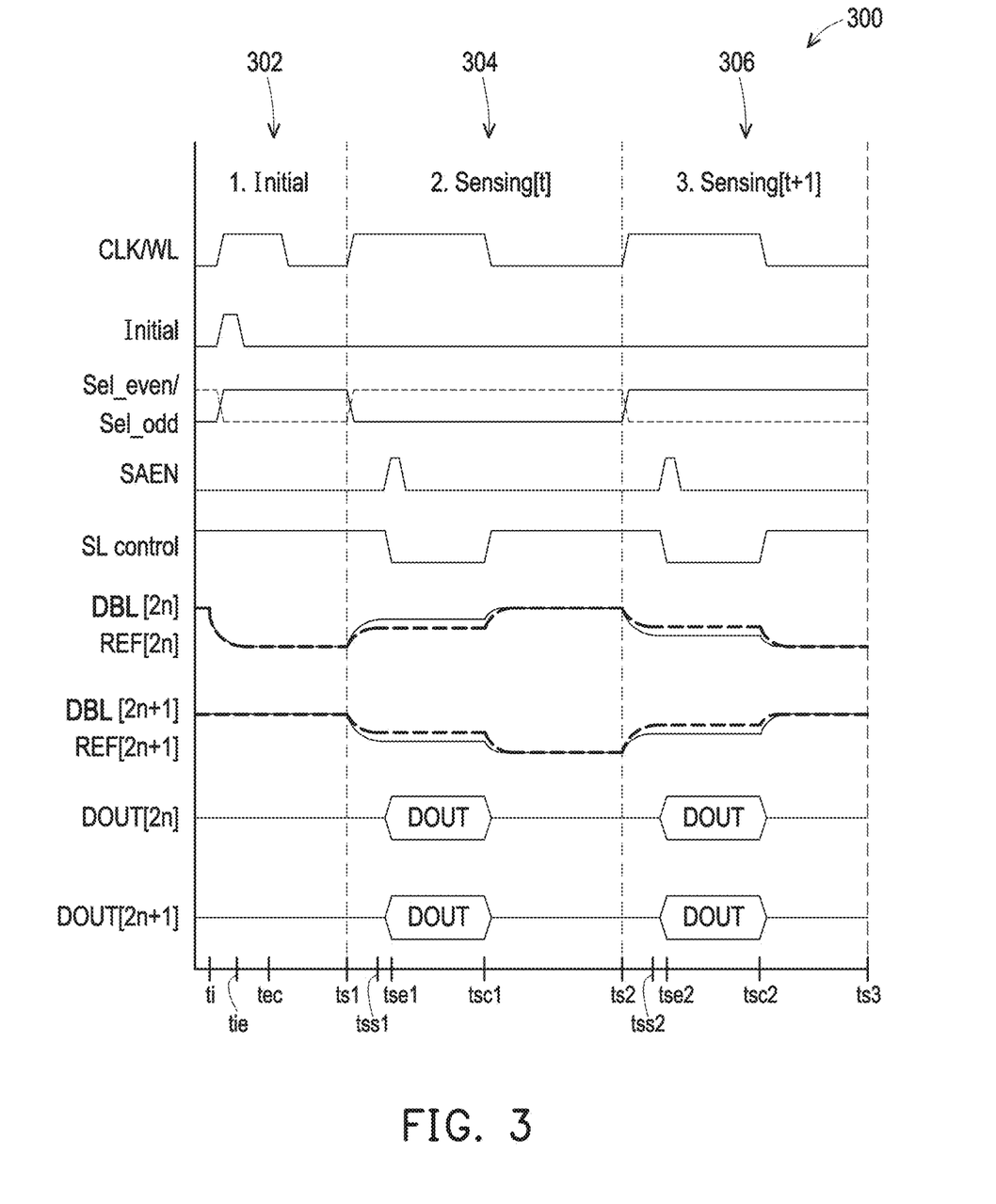
FIG. 3 is a voltage diagram that describes the operation of the memory circuit.

FIG. 3 is a voltage diagram 300 that describes the operation of the memory circuit 200.

The voltage diagram 300 defines three time periods, which includes an initial cycle 302 from a time t1 to a time ts1, a sense cycle 304 from time ts1 to a time ts2, and a sense cycle 306 from time ts2 to a time ts3.

The initial cycle 302 occurs during the startup of the memory circuit 200. At time ti, the clock signal CLK and a word line signal WL are switched from the second clock state (e.g., low voltage clock state) to the first clock state (e.g., high voltage clock state). In response, the timing control circuit 210 generates the select signal Sel_even so that the select signal Sel_even switches from the first select state (e.g., high voltage state) to the second select state (e.g., low voltage state). The select signal Sel_even remains in the second select state throughout the initial cycle 302. Also, in response, the timing control circuit 210 generates the select signal Sel_odd so that the select signal Sel_even switches from the second select state to the first select state. The select signal Sel_odd remains in the first select state throughout the initial cycle 302. Additionally, in response, the initiate signal Initial is switched from the non-initiate state (e.g., low voltage state) to the initiate state (e.g., high voltage state) at time ti. A sense enable signal SAEN remains the non_enabled state (e.g., low voltage state) throughout the initial cycle 302. The select line control signal SL control also remains in the non select state (e.g., high voltage state) throughout the initial cycle 302.

At time ti, the data bit line DBL[2n] and the reference line REF[2n] are discharged from the first reference voltage Vread to the second reference voltage 0V. The data bit line DBL[2n+1] and the reference line REF[2n+1] remain at the first reference voltage Vread throughout the initial cycle 302. At a time tie, the initiate signal Initial is switched from the initiate state to the non-initiate state. At a time tec, the clock signal CLK and the word line signal WL are switched from the first clock state to the second clock state. The initial cycle 302 ends at time is 1 and the sense cycle 304 starts at time ts1.

At time ts1, the clock signal CLK and the word line signal WL are switched from the second clock state to the first clock state. In response, the timing control circuit 210 is configured to switch the select signal Sel_even from the second select state to the first select state and to switch the select signal Sel_odd from the first select state to the second select state. Also, in response, the charge voltage select unit 205E is configured to apply the first reference voltage Vread to charge the data bit line DBL[2n] and the reference line REF[2n]. The sense cycle 304 is thus a charge cycle for the memory subcircuit 201E. Additionally, in response, the charge voltage select unit 205O is configured to apply the second reference voltage 0V to charge the data bit line DBL[2n+1] and the reference line REF[2n+1]. The sense cycle 304 is thus a discharge cycle for the memory subcircuit 201O.

At a time tss1, the sense enable signal SAEN is switched from the non_enabled state to the enable state. In response, the select line control signal SL control is switched from the select state to the non_select state. In response, the VSA 206E is configured to compare the data bit voltage on the data bit line DBL[2n] and the reference voltage on the reference line REF[2n] so as to generate the output voltage DOUT[2n] in a high voltage state or a low voltage state based on the comparison. Neither the data bit line DBL[2n] nor the reference line REF[2n] reach the rail voltage (e.g., the first reference voltage Vread) since the selected select line SL[15:0] is in the non_select state. Also, in response, the VSA 206O is configured to compare the data bit voltage on the data bit line DBL[2n+1] and the reference voltage on the reference line REF[2n] so as to generate the output voltage DOUT[2n+1] in a high voltage state or a low voltage state based on the comparison. Neither the data bit line DBL[2n+1] nor the reference line REF[2n+1] reach the rail voltage (e.g., the second reference voltage 0V) since the selected select line SL[31:16] is in the non_select state. At a time tse1, the sense enable signal SAEN is switched from the enable state to the non_enabled state.

At a time tsc1, the clock signal CLK and the word line signal WL are switched from the first clock state to the second clock state, where the clock signal CLK and the word line signal WL remain for the remainder of the sense cycle 304. In response, the select line control signal SL control is switched from the non_select state to the select state. Accordingly, the data bit line DBL[2n] and the reference line REF[2n] reach the rail voltage (e.g., the first reference voltage Vread). Accordingly, the data bit line DBL[2n+1] and the reference line REF[2n+1] reach the rail voltage (e.g., the second reference voltage 0V). The sense cycle 304 ends at time ts2 and the sense cycle 306 begins at time ts2.

At time ts2, the clock signal CLK and the word line signal WL are switched from the second clock state to the first clock state. In response, the timing control circuit 210 is configured to switch the select signal Sel_even from the first select state to the second select state and to switch the select signal Sel_odd from the second select state to the first select state. Also, in response, the charge voltage select unit 205E is configured to apply the second reference voltage 0V to discharge the data bit line DBL[2n] and the reference line REF[2n]. The sense cycle 306 is thus a discharge cycle for the memory subcircuit 201E. Additionally, in response, the charge voltage select unit 205O is configured to apply the first reference voltage Vread to charge the data bit line DBL[2n+1] and the reference line REF[2n+1]. The sense cycle 306 is thus a charge cycle for the memory subcircuit 201O.

At a time tss2, the sense enable signal SAEN is switched from the non_enabled state to the enable state. In response, the select line control signal SL control is switched from the select state to the non_select state. In response, the VSA 206E is configured to compare the data bit voltage on the data bit line DBL[2n] and the reference voltage on the reference line REF[2n] so as to generate the output voltage DOUT[2n] in the high voltage state or the low voltage state based on the comparison. Neither the data bit line DBL[2n] nor the reference line REF[2n] reach the rail voltage (e.g., the second reference voltage 0V) since the selected select line SL[15:0] is in the non_select state. Also, in response, the VSA 206O is configured to compare the data bit voltage on the data bit line DBL[2n+1] and the reference voltage on the reference line REF[2n] so as to generate the output voltage DOUT[2n+1] in the high voltage state or the low voltage state based on the comparison. Neither the data bit line DBL[2n+1] nor the reference line REF[2n+1] reach the rail voltage (e.g., the first reference voltage Vread) since the selected select line SL[31:16] is in the non_select state. At a time tse2, the sense enable signal SAEN is switched from the enable state to the non_enabled state.

At a time tsc2, the clock signal CLK and the word line signal WL are switched from the first clock state to the second clock state, where the clock signal CLK and the word line signal WL remain for the remainder of the sense cycle 306. In response, the select control signal select line control signal is switched from the non_select state to the select state. Accordingly, the data bit line DBL[2n] and the reference line REF[2n] reach the rail voltage (e.g., the second reference voltage 0V). Accordingly, the data bit line DBL[2n+1] and the reference line REF[2n+1] reach the rail voltage (e.g., the first reference voltage Vread). Also, in response, the VSA 206E becomes opaque.

The sense cycle 304 is then repeated followed by the sense cycle 306. This repetition of the sense cycle 304 and the sense cycle 306 continues until memory read cycles are to be discontinued. When the memory circuit 200 is again initiated, the initial cycle 302 is performed followed by repeated sequences of sense cycle 304 and sense cycle 306 until again, memory read cycles are discontinued.

Figure 4:
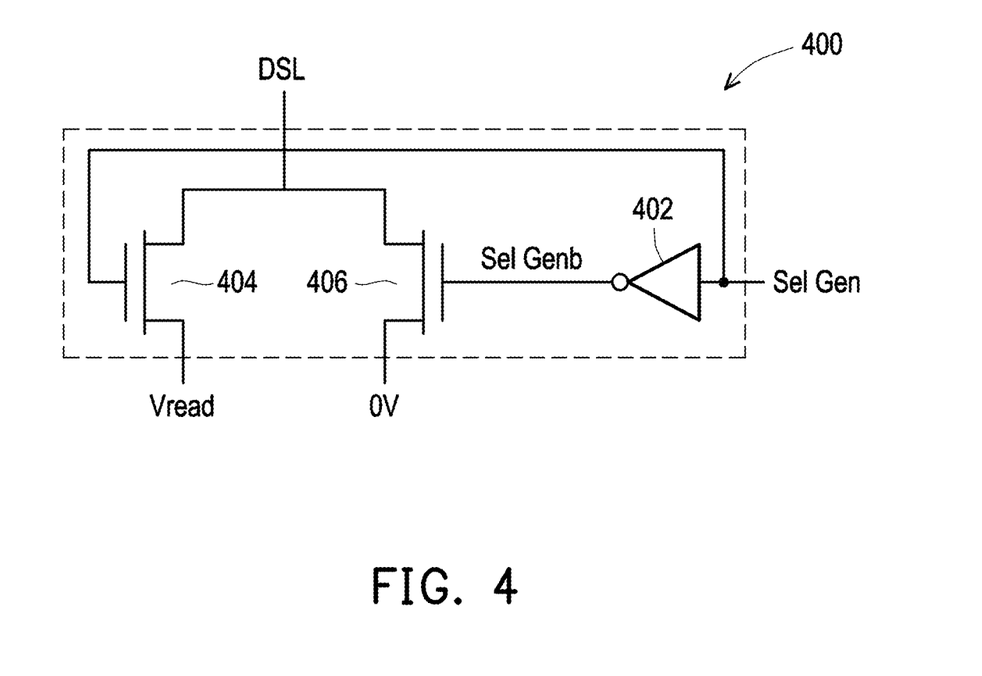
FIG. 4 is a circuit diagram of a charge voltage select unit, in accordance with some embodiments.

FIG. 4 is a circuit diagram of a charge voltage select unit 400, in accordance with some embodiments.

In some embodiments, the charge voltage select unit 400 is an example of the charge voltage select unit 205E in FIG. 2. In some embodiments, the charge voltage select unit 400 is an example of the charge voltage select unit 205O in FIG. 2.

The charge voltage select circuit 400 includes an inverter 402. An input terminal of the inverter 402 is configured to receive a select signal Sel Gen. In some embodiments, the select signal Sel Gen is the select signal Sel_even in FIG. 2. In some embodiments, the select signal Sel Gen is the select signal Sel_odd in FIG. 2. The inverter 402 is configured to generate an inverted select signal Sel Genb from an output terminal.

The charge voltage select circuit 400 also includes two field effect transistors (FETs) 404, 406. In FIG. 2, each of the FETs 404, 406 is an N-type FET. In some embodiments, one or more of the FETs 404, 406 is a P-type FET.

A gate of the FET 404 is configured to receive the select signal Sel Gen and a gate of the FET 406 is configured to receive the select signal Sel Genb. One of the drain/source terminals of the FET 404 is connected to one of the drain/source terminals of the FET 406. The connected drain/source terminals of the FETs 404, 406 are each connected to the data source line DSL. In some embodiments, the data source line DSL is the data source line DSL[2n] in FIG. 2. In some embodiments, the data source line DSL is the data source line DSL[2n+1] in FIG. 2.

The other drain/source terminal of the FET 404 is configured to receive the first reference voltage Vread. The other drain/source terminal of the FET 406 is configured to receive the second reference voltage 0V. As such, the FET 404 is configured to turn on and apply the first reference voltage Vread on the data source line DSL in response to the select signal Sel Gen being in the first select state while the FET 406 is configured to be turned off in response to the select signal Sel Gen being in the first select state (since the inverted select signal is in the second select state). The FET 406 is configured to turn on and apply the second reference voltage 0V on the data source line DSL in response to the select signal Sel Gen being in the second select state (because the inverted select signal is in the first select state) while the FET 404 is configured to be turned off in response to the select signal Sel Gen being in the second select state.

Figure 5:
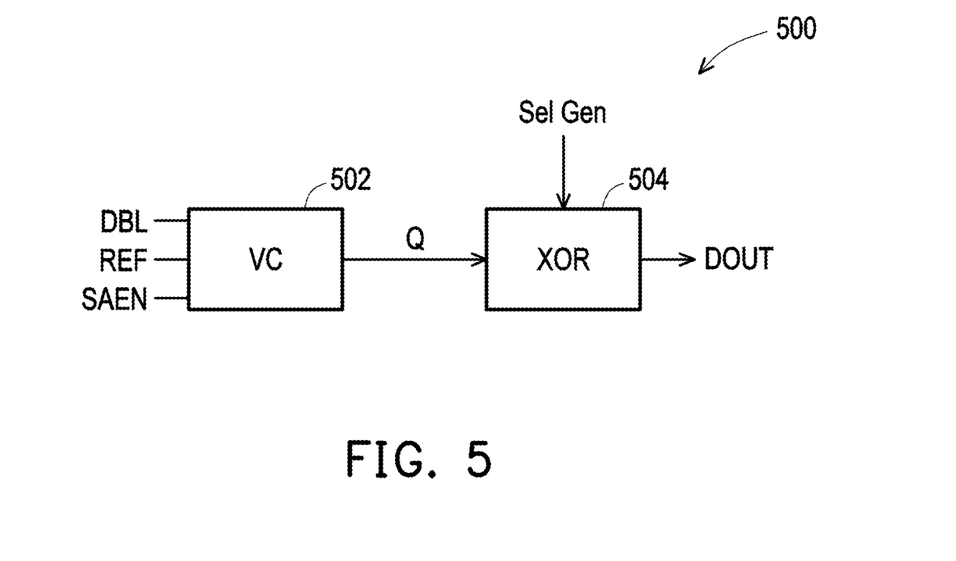
FIG. 5 is a block diagram of a voltage sense amplifier (VSA), in accordance with some embodiments.

FIG. 5 is a block diagram of a VSA 500, in accordance with some embodiments.

In some embodiments, the VSA 500 is an example of the VSA 206E in FIG. 2. In some embodiments, the VSA 500 is an example of the VSA 206O in FIG. 2.

VSA 500 includes a voltage comparator 502. The voltage comparator 502 is configured to receive a bit line voltage on a data bit line DBL, receive a reference voltage on a reference line REF, and receive the sense enable signal SAEN. In some embodiments, the data bit line DBL is the data bit line DBL[2n] in FIG. 2. In some embodiments, the data bit line DBL is the data bit line DBL[2n+1] in FIG. 2. In some embodiments, the reference line REF is the reference line REF[2n] in FIG. 2. In some embodiments, the reference line REF is the reference line REF[2n+1] in FIG. 2.

The voltage comparator 502 is opaque in response to the sense enable signal SAEN being in the non_enabled state. Thus, the voltage comparator 502 is not affected by the bit line voltage on the data bit line DBL and the reference voltage on the reference line REF when the sense enable signal SAEN is in the non_enabled state.

However, the voltage comparator 502 is configured to compare the bit line voltage on the data bit line DBL and the reference voltage on the reference line REF in response the sense enable signal SAEN being in the enable state. In response to the bit line voltage being higher than the reference voltage, the voltage comparator 502 is configured to output a sense voltage Q in the high voltage state. In response to the bit line voltage being lower than the reference voltage, the voltage comparator 502 is configured to output the sense voltage Q in the low voltage state.

The VSA 500 includes an XOR gate 504. The XOR gate 504 is configured to receive the sense voltage Q and the select signal Sel Gen. The XOR gate 504 is configured to output an output voltage DOUT. In some embodiments, the output voltage DOUT is the output voltage DOUT[2n] in FIG. 2. In some embodiments, the output voltage DOUT is the output voltage DOUT[2n+1] in FIG. 2.

The XOR gate 504 is configured to invert the sense voltage Q in response to the select signal being in the first select state. Accordingly, the XOR gate 504 is configured to generate the output voltage DOUT in the low voltage state in response to the sense voltage Q being in the high voltage state and the select signal being in the first select state. The XOR gate 504 is configured to generate the output voltage DOUT in a high voltage state in response to the sense voltage Q being in a low voltage state and the select signal being in the first select state.

The XOR gate 504 is configured to not invert the sense voltage Q in response to the select signal being in the second select state. Accordingly, the XOR gate 504 is configured to generate the output voltage DOUT in the low voltage state in response to the sense voltage Q being in the low voltage state and the select signal being in the second select state. The XOR gate 504 is configured to generate the output voltage DOUT in the high voltage state in response to the sense voltage Q being in the high voltage state and the select signal being in the second select state.

Figure 6:
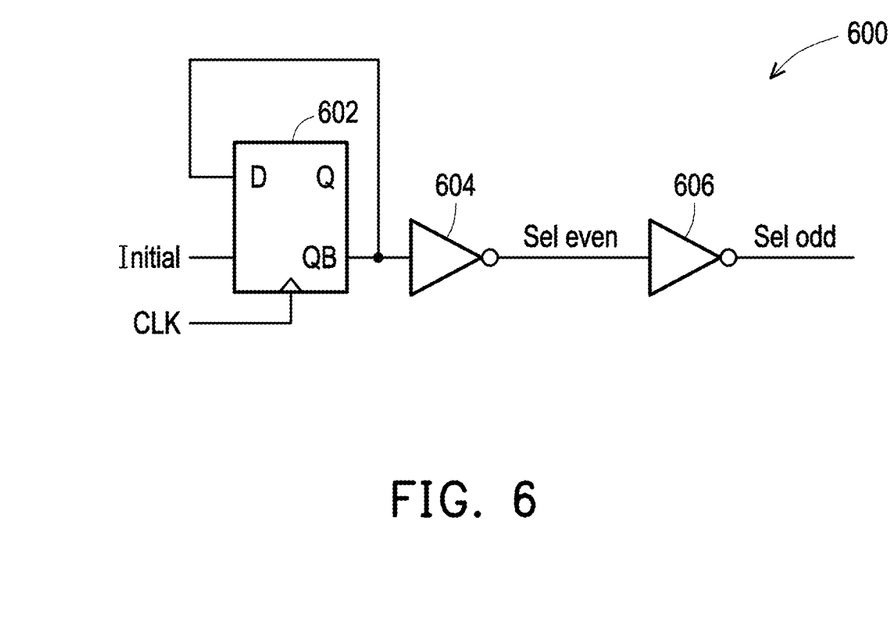
FIG. 6 is a block diagram of a timing control circuit, in accordance with some embodiments.

FIG. 6 is a block diagram of a timing control circuit 600, in accordance with some embodiments.

In some embodiments, the timing control circuit 600 is an example of the timing control circuit 210 in FIG. 2.

The timing control circuit 600 includes a D-type flip flop 602, an inverter 604, and an inverter 606. The D-type flip flop 602 receives the initiate signal Initial at an enable terminal and the clock signal CLK at a clock terminal of the D-type flip flop 602. The non-inverted output of the D-type flip flop 602 is not connected. The inverted output of the D-type flip flop 602 is fed back to the data terminal of the D-type flip flop 602.

The D-type flip flop 602 is transparent in response to the clock signal CLK being in the high voltage state and is opaque in response to the clock signal CLK being in the low voltage state. Thus, the initiate signal Initial initiates the D-type flip flop 602 so that the inverted output of the D-type flip flop 602 is in the high voltage state. The inverted output of the D-type flip flop 602 remains in the high voltage state for the remainder of the initial clock cycle since the D-type flip flop 602 is opaque once the clock signal CLK is provided in the low voltage state.

The inverter 604 has an input terminal connected to the inverted output terminal of the D-type flip flop 602 and an output terminal connected to the input terminal of the inverter 606. The inverter 604 generates the select signal Sel_even from the inverted output of the D-type flip flop 602. The inverter 606 generates the select signal Sel_odd from the select signal Sel_even. Because the inverted output of the D-type flip flop 602 is fed back to the data terminal of the D-type flip flop 602, the select signal Sel_even and the select signal Sel_odd switch voltage states (i.e., high voltage state to low voltage state or low voltage state to high voltage state) in response to each positive clock edge of the clock signal CLK. In other embodiments, the timing control circuit 600 is configured so that the select signal Sel_even and the select signal Sel_odd switch voltage states in response to the negative clock edge of the clock signal CLK.

Figure 7:
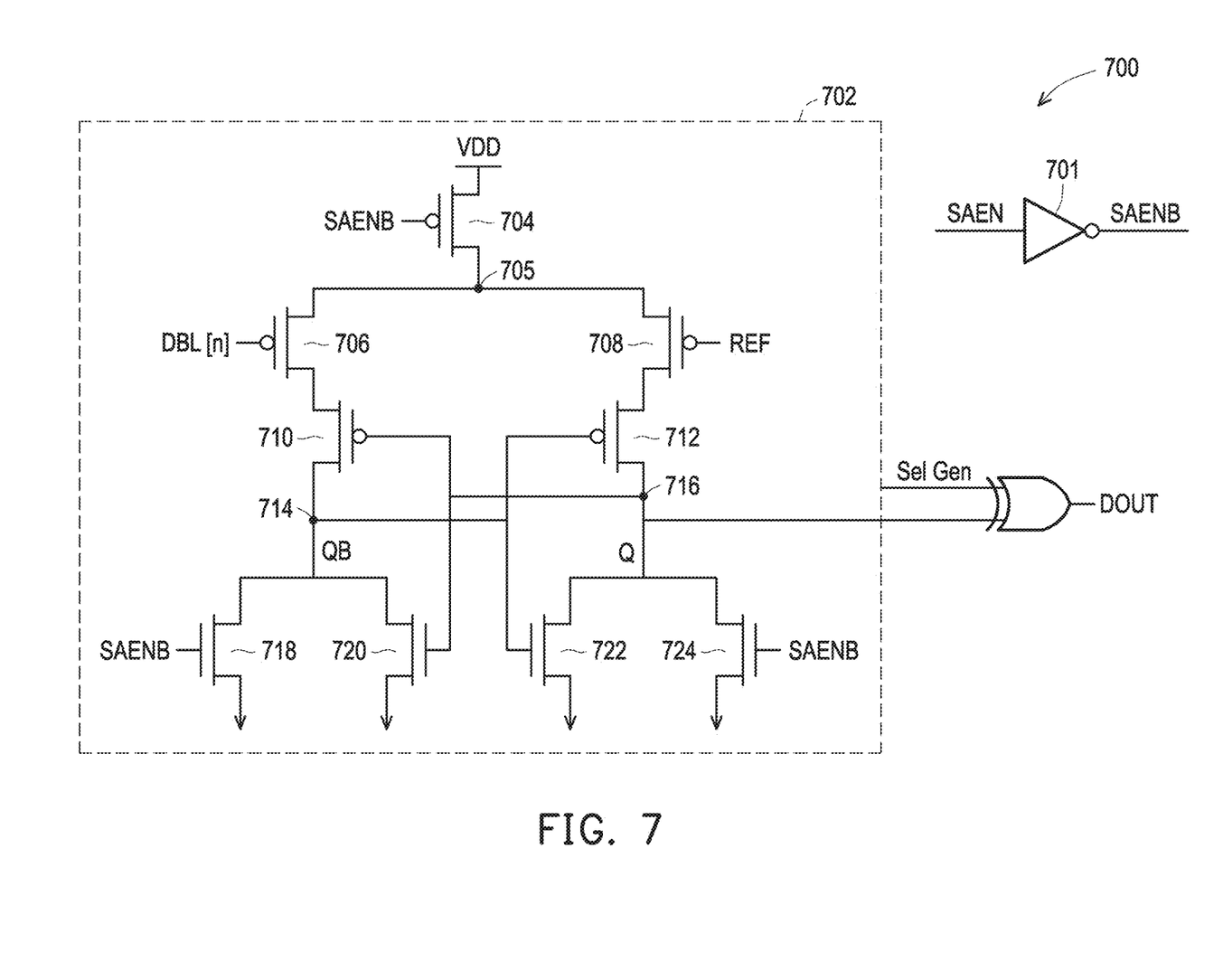
FIG. 7 is a circuit diagram of a VSA, in accordance with some embodiments.

FIG. 7 is a circuit diagram of a VSA 700, in accordance with some embodiments.

In some embodiments, the VSA 700 is an example of the VSA 206E in FIG. 2. In some embodiments, the VSA 700 is an example of the VSA 206O in FIG. 2. In some embodiments, the VSA 700 is an example of the VSA 500 in FIG. 5.

VSA 700 includes a voltage comparator 702. The voltage comparator 702 is configured to receive a bit line voltage on a data bit line DBL[n], receive a reference voltage on a reference line REF, and receive the sense enable signal SAEN. In some embodiments, the data bit line DBL[n] is the data bit line DBL[2n] in FIG. 2. In some embodiments, the data bit line DBL[n] is the data bit line DBL[2n+1] in FIG. 2. In some embodiments, the reference line REF is the reference line REF[2n] in FIG. 2. In some embodiments, the reference line REF is the reference line REF[2n+1] in FIG. 2.

The VSA 700 includes an inverter 701 that is configured to invert the sense enable signal SAEN and generate the inverted sense enable signal SAENB.

The voltage comparator 702 includes a PFET 704. A source of the PFET 704 is configured to receive a power source voltage VDD. A drain of the PFET 704 is connected to a node 705. A gate of the PFET 704 is configured to receive the inverted sense enable signal SAENB.

The voltage comparator 702 also includes a PFET 706, a PFET 708, a PFET 710, and a PFET 712. The source of the PFET 706 and the source of the PFET 708 are connected to the node 705. The drain of the PFET 706 is connected to the source of the PFET 710. The drain of the PFET 708 is connected to the source of the PFET 712. The source of the PFET 710 is connected to a node 714 and the source of the PFET 712 is connected to a node 716. The sense voltage Q is generated from the node 716. The inverted sense voltage QB is generated from the node 714. A gate of the PFET 706 is connected to the data bit line DBL[n]. The gate of the PFET 706 is configured to receive the data bit line voltage of the data bit line DBL[n]. A gate of the PFET 708 is connected to the reference line REF. The gate of the PFET 708 is configured to receive the reference voltage of the reference line REF.

The voltage comparator 702 includes an NFET 718, an NFET 720, an NFET 722, and an NFET 724. Each of a drain of the NFET 718 and a drain of the NFET 720 is connected to the node 714. Each of a drain of the NFET 722 and a drain of the NFET 724 is connected to the node 716. A source of the NFET 718, a source of the NFET 720, a source of the NFET 722, and a source of the NFET 724 are each connected to ground. A gate of the PFET 710 and a gate of the NFET 720 are connected to the node 716 and thus receive the sense voltage Q. A gate of the PFET 712 and a gate of the NFET 722 are connected to the node 714 and thus receive the inverted sense voltage QB. A gate of the NFET 718 is configured to receive the inverted sense enable signal SAENB and the gate of the NFET 724 is configured to receive the sense enable signal SAEN.

The voltage comparator 702 is opaque in response to the sense enable signal SAEN being in the non_enabled state. Thus, the voltage comparator 702 is not affected by the bit line voltage on the data bit line DBL[n] and the reference voltage on a reference line REF when the sense enable signal SAEN is in the non_enabled state. In response to the sense enable signal SAEN being in the non_enabled state, the PFET 704 is turned off and the NFETs 718, 724 are turned off. Both the sense voltage Q and the inverted sense voltage QB are driven to the low voltage state (e.g., the ground voltage).

The voltage comparator 702 is configured to compare the bit line voltage on the data bit line DBL[n] and the reference voltage on the reference line REF in response to the sense enable signal SAEN being in the enable state. In response to the sense enable signal SAEN being in the enable state, the PFET 704 is turned on and the NFETs 718, 724 are turned off. In response to the bit line voltage on the data bit line DBL[n] being higher than the reference voltage on the reference voltage line REF, the PFETs 708, 712 drive the sense voltage Q to the high voltage state (e.g., at or near the power source voltage VDD). Accordingly, the NFET 720 is turned on and thereby drives the inverted sense voltage QB to the low voltage state (e.g., at or near ground). Alternatively, in response to the bit line voltage on the data bit line DBL[n] being lower than the reference voltage on the reference voltage line REF, the PFETs 706, 710 drive the sense voltage Q to the low voltage state. Accordingly, the NFET 722 is turned on and thereby drives the inverted sense voltage QB to the high voltage state.

The VSA 700 includes an XOR gate 726. The XOR gate 726 is configured to receive the sense voltage Q and the select signal Sel Gen. The XOR gate 726 is configured to output an output voltage DOUT. In some embodiments, the output voltage DOUT is the output voltage DOUT[2n] in FIG. 2. In some embodiments, the output voltage DOUT is the output voltage DOUT[2n+1] in FIG. 2.

The XOR gate 726 is configured to invert the sense voltage Q in response to the select signal Sel Gen being in the first select state. Accordingly, the XOR gate 726 is configured to generate the output voltage DOUT in the low voltage state in response to the sense voltage Q being in the high voltage state and the select signal Sel Gen being in the first select state. The XOR gate 726 is configured to generate the output voltage DOUT in the high voltage state in response to the sense voltage Q being in the low voltage state and the select signal Sel Gen being in the first select state.

The XOR gate 726 is configured to not invert the sense voltage Q in response to the select signal Sel Gen being in the second select state. Accordingly, the XOR gate 726 is configured to generate the output voltage DOUT in the low voltage state in response to the sense voltage Q being in the low voltage state and the select signal Sel Gen being in the second select state. The XOR gate 726 is configured to generate the output voltage DOUT in the high voltage state in response to the sense voltage Q being in the high voltage state and the select signal Sel Gen being in the second select state.

Figure 8:
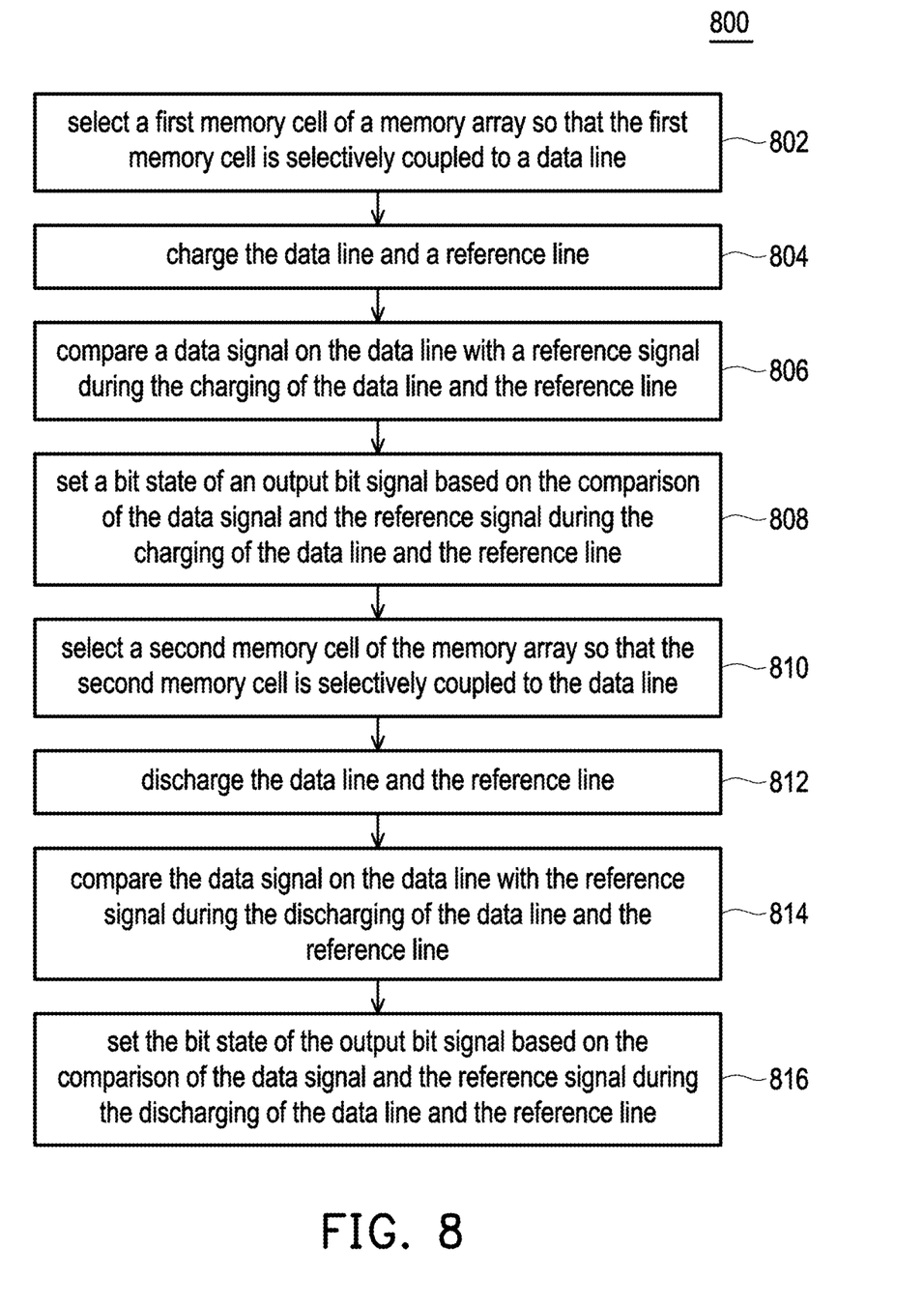
FIG. 8 is a flowchart of a method of determining bit states of bits stored in a memory circuit, in accordance with some embodiments.

FIG. 8 is a flowchart of a method 800 of determining bit states of bits stored in a memory circuit, in accordance with some embodiments. Method 800 is usable with a memory circuit, e.g., memory circuits 100 and 200 discussed above with respect to FIGS. 1-7.

The sequence in which the operations of method 800 are depicted in FIG. 8 is for illustration only; the operations of method 800 are capable of being executed in sequences that differ from that depicted in FIG. 8. In some embodiments, operations in addition to those depicted in FIG. 8 are performed before, between, during, and/or after the operations depicted in FIG. 8. In some embodiments, the operations of method 800 are a subset of operations of a method of operating a memory circuit.

Method 800 includes blocks 802-816. Flow begins at block 802.

At block 802, a first memory cell of a memory array is selected so that the first memory cell is selectively coupled to a data line. Memory cells 202E of the memory array in the memory subcircuit 201E and the memory cells 202O of the memory array in the memory subcircuit 201O are examples of the first memory cell of the memory array, in accordance with some embodiments. Examples of the data line are the data bit line DBL[2n] and the data bit line DBL[2n+1], in accordance with some embodiments. In some embodiments, block 802 is performed by the multiplexer 204E or multiplexer 204O. Flow proceeds to block 804.

At block 804, the data line and a reference line are charged. Examples of the reference line are the reference line REF[2n] and the reference line REF[2n+1], in accordance with some embodiments. In some embodiments, block 804 is performed by charge voltage select unit 205E or charge voltage select unit 205O. Flow proceeds to block 806.

At block 806, a data signal on the data line is compared with a reference signal during the charging of the data line and the reference line. In some embodiments, the data signal is the data voltage on the data bit line DBL[2n] or the data bit line DBL[2n+1]. In some embodiments, the reference signal is the reference voltage on the reference line REF[2n] or the reference line REF[2n+1]. Flow proceeds to block 808.

At block 808, a bit state of an output bit signal is set based on the comparison of the data signal and the reference signal during the charging of the data line and the reference line. The output voltage DOUT [2n] and the output voltage DOUT [2n+1] are examples of the output bit signal, in accordance with some embodiments. In some embodiments, the charging of the data line and reference line corresponds to the data line DBL[2n] and reference line REF[2n] during the sense cycle 304 or to the data line DBL[2n+1] and reference line REF[2n+1] during the sense cycle 306 in FIG. 3. Flow proceeds to block 810.

At block 810, a second memory cell of the memory array is selected so that the second memory cell is selectively coupled to the data line. Memory cells 202E of the memory array in the memory subcircuit 201E and the memory cells 202O of the memory array in the memory subcircuit 201O are examples of the second memory cell of the memory array, in accordance with some embodiments. Flow proceeds to block 812.

At block 812, the data line and the reference line are discharged. Flow proceeds to block 814.

At block 814, the data signal on the data line is compared with the reference signal during the discharging of the data line and the reference line. In some embodiments, the discharging of the data line and reference line corresponds to the data line DBL[2n+1] and reference line REF[2n+1] during the sense cycle 304 or to the data line DBL[2n] and reference line REF[2n] during the sense cycle 306 in FIG. 3. Flow proceeds to block 816.

At block 816, the bit state of the output bit signal is set based on the comparison of the data signal and the reference signal during the discharging of the data line and the reference line.

In some embodiments, a memory circuit, includes: a memory cell configured to store a bit; a reference line configured to receive a reference signal; a data line configured to receive a data signal, wherein the data line is configured to be selectively coupled to the memory cell; a charge voltage select unit configured to charge the reference line and the data line in response to a select signal being in a first select state and discharge the reference line and the data line in response to the select signal being in a second select state; and a sense amplifier configured to compare the data signal and the reference signal to sense a bit state of the bit stored by the memory cell. In some embodiments, the sense amplifier is configured to receive a sense signal that oscillates between an enable state and an non-enabled state; the sense amplifier is configured to compare the data signal and the reference signal in response to the sense signal being in the enable state; and the sense signal oscillates between the enable state and the non-enabled state such that the sense signal is in the enable state both when the select signal is in the first select state and when the select signal is in the second select state. In some embodiments, the memory cell includes a magnetic tunnel junction (MTJ) memory cell. In some embodiments, the memory cell includes a resistive memory cell. In some embodiments, the memory circuit further includes: a memory array of memory cells that include the memory cell; a multiplexer configured to select one of the memory cells in the memory array such that the data line is selectively coupled to the selected one of the memory cells; a second memory array of second memory cells; a second reference line configured to receive a second reference signal; a second data line configured to receive a second data signal; a second multiplexer configured to select one of the second memory cells in the second memory array such that the second data line is selectively coupled to the selected one of the second memory cells; a second charge voltage select unit configured to receive a first reference voltage, a second reference voltage, and a second select signal, wherein the charge voltage select unit is configured to apply the first reference voltage to the second reference line and the second data line in response to the second select signal being in the first select state and to apply the second reference voltage to the second data line and the second reference line in response to the second select signal being in the second select state; and a second sense amplifier configured to compare the second data signal and the second reference signal and generate a second output bit signal having a bit state based on the comparison of the second data signal and the second reference signal In some embodiments, a timing control circuit configured to generate the select signal and the second select signal such that when the select signal is in the first select state the second select signal is in the second select state, and when the select signal is in the second select state the second select signal is in the first select state. In some embodiments, the timing control circuit includes a flip flop having an output bit terminal, a data input terminal, and a clock terminal configured to receive a clock signal, wherein the output bit terminal is connected so as to be fed back to the data input terminal.

In some embodiments, a memory circuit, includes: a memory array of memory cells; a reference line configured to receive a reference voltage; a data line configured to receive a data signal; a multiplexer configured to select one of the memory cells in the memory array such that the data line is selectively coupled to the selected one of the memory cells; a charge voltage select unit configured to receive a first reference signal, a second reference signal, and a second select signal, wherein the first reference signal has a voltage level is greater than a voltage level of the second reference signal and wherein the charge voltage select unit is configured to apply the first reference signal to the reference line and the data line in response to the select signal being in a first select state and to apply the second reference signal to the data line and the reference line in response to the select signal being in a second select state; and a sense amplifier configured to compare the data signal and the reference voltage and generate an output bit signal having a bit state based on the comparison of the data signal and the reference signal. In some embodiments, the sense amplifier is configured to receive a sense signal that oscillates between an enable state and an non-enabled state; the sense amplifier is configured to compare the data signal and the reference signal in response to the sense signal being in the enable state; and the sense signal oscillates between the enable state and the non-enabled state such that the sense signal is in the enable state both when the select signal is in the first select state and when the select signal is in the second select state. In some embodiments, the memory cells comprise magnetic tunnel junction (MTJ) memory cells. In some embodiments, the memory cells comprise resistive memory cells. In some embodiments, the memory circuit further includes: a second memory array of second memory cells; a second reference line configured to receive a second reference voltage; a second data line configured to receive a second data signal; a second multiplexer configured to select one of the second memory cells in the second memory array such that the second data line is selectively coupled to the selected one of the second memory cells; a second charge voltage select unit configured to receive the first reference signal, the second reference signal, and a second select signal wherein the second charge voltage select unit is configured to apply the first reference signal to the second reference line and the second data line in response to the second select signal being in the first select state and to apply the second reference signal to the second data line and the second reference line in response to the second select signal being in the second select state; and a second sense amplifier configured to compare the second data signal and the second reference voltage and generate a second output bit signal having a bit state based on the comparison of the second data signal and the second reference voltage. In some embodiments, the memory circuit further includes a timing control circuit configured to generate the select signal and the second select signal such that when the select signal is in the first select state the second select signal is in the second select state, and when the select signal is in the second select state the second select signal is in the first select state. In some embodiments, the timing control circuit includes a flip flop having an output bit terminal, a data input terminal, and a clock terminal configured to receive a clock signal, wherein the output bit terminal is connected so as to be fed back to the data input terminal.

In some embodiments, a method of determining bit states of a bit stored in a memory circuit, the method includes: selecting a first memory cell of a memory array such that the first memory cell is selectively coupled to a data line; charging the data line and a reference line; comparing a data signal on the data line with a reference signal during the charging of the data line and the reference line; setting a bit state of an output bit signal based on the comparison of the data signal and the reference signal during the charging of the data line and the reference line; selecting a second memory cell of the memory array such that the second memory cell is selectively coupled to the data line; discharging the data line and the reference line; comparing the data signal on the data line with the reference signal during the discharging of the data line and the reference line; and setting the bit state of the output bit signal based on the comparison of the data signal and the reference signal during the discharging of the data line and the reference line. In some embodiments, each of the selecting the first memory cell and the selecting the second memory cell includes selecting a magnetic tunnel junction (MTJ) memory cell. In some embodiments, each of the selecting the first memory cell and the selecting the second memory cell includes selecting a resistive memory cell. In some embodiments, each of the selecting the first memory cell and the selecting the second memory cell includes using a multiplexer. In some embodiments, the charging the data line and the reference line includes using a charge voltage select unit to select a first reference voltage, and the discharging the data line and the reference line includes using the charge voltage select unit to select a second reference voltage. In some embodiments, the comparing the data signal on the data line with the reference signal during each of the charging of the data line and the reference line and the discharging of the data line and the reference line includes using a sense amplifier.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

What is claimed is:

1. A memory circuit, comprising:
   first and second memory cells;
   a reference line configured to receive a reference signal;
   a data line configured to receive a data signal, wherein the data line is configured to be selectively coupled to each of the first memory cell and the second memory cell;
   a charge voltage select unit configured to charge the reference line and the data line in response to a select signal being in a first select state and discharge the reference line and the data line in response to the select signal being in a second select state; and
   a sense amplifier configured to
      compare the data signal and the reference signal,
      generate a first output bit signal having a first logic level based on a first comparison of the data signal and the reference signal concurrently with the data line being coupled to the first memory cell and the select signal being in the first select state, and
      generate the first output bit signal having a second logic level based on a second comparison of the data signal and the reference signal concurrently with the data line being coupled to the second memory cell and the select signal being in the second select state.

2. The memory circuit of claim 1, wherein:
   the sense amplifier is configured to receive a sense signal that oscillates between an enable state and a non-enabled state;
   the sense amplifier is configured to compare the data signal and the reference signal in response to the sense signal being in the enable state; and
   the sense signal oscillates between the enable state and the non-enabled state such that the sense signal is in the enable state both when the select signal is in the first select state and when the select signal is in the second select state.

3. The memory circuit of claim 1, wherein the memory cell comprises a magnetic tunnel junction (MTJ) memory cell.

4. The memory circuit of claim 1, wherein the memory cell comprises a resistive memory cell.

5. The memory circuit of claim 1, further comprising:
   a memory array of memory cells that include the first memory cell and the second memory cell;

a multiplexer configured to select one of the memory cells in the memory array such that the data line is selectively coupled to the selected one of the memory cells;

a second memory array of second memory cells;

a second reference line configured to receive a second reference signal;

a second data line configured to receive a second data signal;

a second multiplexer configured to select one of the second memory cells in the second memory array such that the second data line is selectively coupled to the selected one of the second memory cells;

a second charge voltage select unit configured to receive a first reference voltage, a second reference voltage, and a second select signal, wherein the second charge voltage select unit is configured to apply the first reference voltage to the second reference line and the second data line in response to the second select signal being in the first select state and to apply the second reference voltage to the second data line and the second reference line in response to the second select signal being in the second select state; and a second sense amplifier configured to compare the second data signal and the second reference signal and generate a second output bit signal having a third logic level based on the comparison of the second data signal and the second reference signal.

6. The memory circuit of claim 5, further comprising a timing control circuit configured to generate the select signal and the second select signal such that when the select signal is in the first select state the second select signal is in the second select state, and when the select signal is in the second select state the second select signal is in the first select state.

7. The memory circuit of claim 6, wherein the timing control circuit comprises a flip flop having an output bit terminal, a data input terminal, and a clock terminal configured to receive a clock signal, wherein the output bit terminal is connected so as to be fed back to the data input terminal.

8. A memory circuit, comprising:
a memory array of memory cells;
a reference line configured to receive a reference voltage;
a data line configured to receive a data signal;
a multiplexer configured to select one of the memory cells in the memory array such that the data line is selectively coupled to the selected one of the memory cells;

a charge voltage select unit configured to receive a first reference signal, a second reference signal, and a select signal, wherein the first reference signal has a voltage level greater than a voltage level of the second reference signal and wherein the charge voltage select unit is configured to apply the first reference signal to the reference line and the data line in response to the select signal being in a first select state and to apply the second reference signal to the data line and the reference line in response to the select signal being in a second select state; and a sense amplifier configured to
compare the data signal and the reference voltage,
generate an output bit signal having a first bit state based on a first comparison of the data signal and the reference signal concurrently with the data line being coupled to a first selected one of the memory cells and the select signal being in the first select state, and
generate the output bit signal having a second bit state based on a second comparison of the data signal and the reference signal concurrently with the data line being coupled to a second selected one of the memory cells and the select signal being in the second select state.

9. The memory circuit of claim 8, wherein:
the sense amplifier is configured to receive a sense signal that oscillates between an enable state and a non-enabled state;
the sense amplifier is configured to compare the data signal and the reference signal in response to the sense signal being in the enable state; and
the sense signal oscillates between the enable state and the non-enabled state such that the sense signal is in the enable state both when the select signal is in the first select state and when the select signal is in the second select state.

10. The memory circuit of claim 8, wherein the memory cells comprise magnetic tunnel junction (MTJ) memory cells.

11. The memory circuit of claim 8, wherein the memory cells comprise resistive memory cells.

12. The memory circuit of claim 8, further comprising:
a second memory array of second memory cells;
a second reference line configured to receive a second reference voltage;
a second data line configured to receive a second data signal;
a second multiplexer configured to select one of the second memory cells in the second memory array such that the second data line is selectively coupled to the selected one of the second memory cells;
a second charge voltage select unit configured to receive the first reference signal, the second reference signal, and a second select signal wherein the second charge voltage select unit is configured to apply the first reference signal to the second reference line and the second data line in response to the second select signal being in the first select state and to apply the second reference signal to the second data line and the second reference line in response to the second select signal being in the second select state; and
a second sense amplifier configured to compare the second data signal and the second reference voltage and generate a second output bit signal having a third bit state based on the comparison of the second data signal and the second reference voltage.

13. The memory circuit of claim 12, further comprising a timing control circuit configured to generate the select signal and the second select signal such that when the select signal is in the first select state the second select signal is in the second select state, and when the select signal is in the second select state the second select signal is in the first select state.

14. The memory circuit of claim 13, wherein the timing control circuit comprises a flip flop having an output bit terminal, a data input terminal, and a clock terminal configured to receive a clock signal, wherein the output bit terminal is connected so as to be fed back to the data input terminal.

15. A method of determining a bit state of a bit stored in a memory circuit, the method comprising:
selecting a first memory cell of a memory array such that the first memory cell is selectively coupled to a data line;
charging the data line and a reference line;

comparing a data signal on the data line with a reference signal during the charging of the data line and the reference line;

setting, using a sense amplifier, a bit state of an output bit signal based on the comparison of the data signal and the reference signal during the charging of the data line and the reference line while the first memory cell is coupled to the data line;

selecting a second memory cell of the memory array such that the second memory cell is selectively coupled to the data line;

discharging the data line and the reference line;

comparing the data signal on the data line with the reference signal during the discharging of the data line and the reference line; and setting, using the sense amplifier, the bit state of the output bit signal based on the comparison of the data signal and the reference signal during the discharging of the data line and the reference line while the second memory cell is coupled to the data line.

16. The method of claim 15, wherein each of the selecting the first memory cell and the selecting the second memory cell comprises selecting a magnetic tunnel junction (MTJ) memory cell.

17. The method of claim 15, wherein each of the selecting the first memory cell and the selecting the second memory cell comprises selecting a resistive memory cell.

18. The method of claim 15, wherein each of the selecting the first memory cell and the selecting the second memory cell comprises using a multiplexer.

19. The method of claim 15, wherein
the charging the data line and the reference line comprises using a charge voltage select unit to select a first reference voltage, and
the discharging the data line and the reference line comprises using the charge voltage select unit to select a second reference voltage.

20. The method of claim 15, wherein the comparing the data signal on the data line with the reference signal during each of the charging of the data line and the reference line and the discharging of the data line and the reference line comprises using the sense amplifier.

* * * * *